(12) United States Patent
Salowey et al.

(10) Patent No.: US 8,325,914 B2
(45) Date of Patent: Dec. 4, 2012

(54) PROVIDING SECURE COMMUNICATIONS FOR ACTIVE RFID TAGS

(75) Inventors: Joseph Salowey, Seattle, WA (US); Allan Thomson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1297 days.

(21) Appl. No.: 11/945,731

(22) Filed: Nov. 27, 2007

(65) Prior Publication Data

US 2009/0136027 A1    May 28, 2009

(51) Int. Cl.
*H04L 9/00* (2006.01)
(52) U.S. Cl. .................. 380/45; 340/572.1; 713/150
(58) Field of Classification Search .................. 340/12, 340/572, 5, 572.1; 713/150; 380/45
See application file for complete search history.

(56) References Cited

U.S. PATENT DOCUMENTS

| | | | |
|---|---|---|---|
| 2005/0093679 A1* | 5/2005 | Zai et al. ............. | 340/10.2 |
| 2005/0154872 A1* | 7/2005 | McGrew ............... | 713/150 |
| 2007/0069851 A1* | 3/2007 | Sung et al. ............ | 340/5.1 |
| 2008/0150698 A1* | 6/2008 | Smith et al. ........... | 340/10.4 |
| 2008/0204248 A1* | 8/2008 | Cam Winget et al. ... | 340/572.4 |
| 2009/0136027 A1* | 5/2009 | Salowey et al. ........ | 380/45 |

FOREIGN PATENT DOCUMENTS

JP    2005295408    10/2005

OTHER PUBLICATIONS

Frank Siegemund; Interaction in Pervasive Computing Settings using Bluetooth-enabled Active Tags and Passive RFID Technology together with Mobile Phones; Year: 2003; ETH Zurich, Switzerland; pp. 1-10.*
Written Opinion for International Application No. PCT/US2008/083861 dated Jun. 10, 2010.
U.S. Appl. No. 11/678,286, Winget.

* cited by examiner

*Primary Examiner* — April Shan
(74) *Attorney, Agent, or Firm* — Tucker Ellis LLP

(57) ABSTRACT

Described herein in an example embodiment, is a mechanism to distribute and implement secure credentials on a WLAN (wireless local area network) employing radio frequency identification (RFID) tags. Symmetric keys are provisioned to the tag in a manner that allows for optimized re-association and secure announcements. The provisioned keys are derived in a way that enables the controller to operate without having to maintain the key state for every tag. In an example embodiment, the controller generates keys for the RFID tags that are derived from a master key associated with the controller, an identifier assigned to the RFID tag and an address associated with the RFID tag.

15 Claims, 3 Drawing Sheets

PROVIDING SECURE COMMUNICATIONS FOR ACTIVE RFID TAGS

BACKGROUND

Active RFID (radio frequency identification) tags, such as WiFi RFID tags, are employed in many applications. For example RFID tags can be used for asset tracking or location determination. For example, in a hospital RFID tags can be used to enable medical personnel to locate equipment such as heart monitors or defibrillators.

Some RFID tags announce their presence periodically by sending a multicast packet, such as a layer 2, 802.11 multicast packet, to a network without associating to an access point (AP). This is commonly referred to as announce mode. The AP is setup to allow packets to the known multicast address to be forwarded to a controller or other device on the network. Often it is desirable to provide secure communications for active Radio Frequency Identification (RFID) tags. For example, a secured announcement is an announcement encrypted with a key. However, there are several considerations for providing secure RFID communications. For instance, RFID tags have a limited battery life, which can limit what can be transmitted. Also, to preserve battery life, RFID tags have limited computational power, which can limit the complexity of the encryption algorithm employed by the tag.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described herein in an example embodiment, is a mechanism to distribute and implement secure credentials on a WLAN (wireless local area network) employing radio frequency identification (RFID) tags. Symmetric keys are provisioned to the tag in a manner that allows for optimized re-association and secure announcements. The provisioned keys are derived in a way that enables the controller to operate without having to maintain the key state for every tag. In an example embodiment, the controller generates keys for the RFID tags that are derived from a master key associated with the controller, an identifier assigned to the RFID tag and an address associated with the RFID tag.

In accordance with an example embodiment, disclosed herein is an apparatus comprising a wireless controller. The wireless controller comprises logic configured to communicate with a radio frequency identification (RFID) tag via at least one wireless access point. The wireless controller is configured to assign an identifier for the RFID tag during an initial communication session. The wireless controller logic is configured to generate an announce mode key for the RFID tag, the announce mode key is derived from a master key, the identifier and an address for the RFID tag. In some embodiments the address may not be used in the key generation and only the key ID is used. The wireless controller logic is further configured to send the announce mode key to the RFID tag.

In accordance with an example embodiment, there is disclosed herein an apparatus comprising a wireless transceiver and a processor operatively coupled to the wireless transceiver. The processor is configured to send and receive data via the wireless transceiver. The processor is further configured to initiate a first connection with a network via the wireless transceiver. The first connection is secured with a pre-established key. The processor is configured to receive an identifier, an announce mode key and a secondary mode key from the network through the first connection. The processor is also configured to send data packets to the network in announce mode encrypted with the announce mode key. The data packets in announce mode comprise the identifier and an address. The processor is also configured to execute a secondary securely association procedure to establish security with the network using the secondary mode key. In this mode the tag sends and receives encrypted data packets to and from the network. The data packets in secondary association mode comprise the identifier and the address.

In accordance with an example embodiment, there is disclosed herein a method comprising establishing a first connection between a controller and a radio frequency identification (RFID) tag secured with a first key. An identifier and an announce mode key for the RFID tag are generated. The announce mode key is derived from a master key, the identifier and an address for the RFID tag. The announce mode key and identifier are provisioned to the RFID tag. The announce mode key is discarded by the controller responsive to provisioning the announce mode key to the RFID tag. Upon receiving a message from the RFID tag, the message comprising an address and an identifier, and wherein the message is encrypted with the announce mode key, the announce mode key is regenerated. The announce mode key is derived from the master key, the identifier in the message and the address in the message.

BRIEF DESCRIPTION OF THE DRAWINGS

The accompanying drawings incorporated herein and forming a part of the specification illustrate the examples embodiments.

DESCRIPTION OF EXAMPLE EMBODIMENTS

Figure 1:
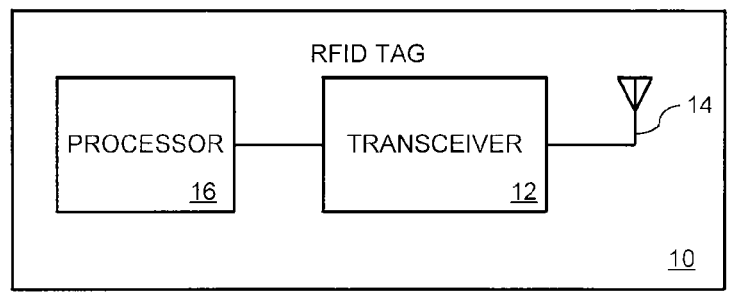
FIG. 1 illustrates an example of a Radio Frequency Identification Tag.

This description provides examples not intended to limit the scope of the appended claims. The figures generally indicate the features of the examples, where it is understood and appreciated that like reference numerals are used to refer to like elements.

Described herein in an example embodiment, is a mechanism to distribute and implement secure credentials on a WLAN (wireless local area network) employing radio frequency identification (RFID) tags. Symmetric keys are provisioned to the tag in a manner that allows for optimized re-association and secure announcements. The provisioned keys are derived in a way that enables the controller to operate without having to maintain the key state for every tag.

The security credentials that are provisioned in an example embodiment comprise a secret key for use in secondary association mode and a secret key for use in announce mode. Secondary association mode is an association mode that is used in place of a primary association mode during normal operation. In an example embodiment, the primary association mode uses an initial security credential that is more cryptographically and transmission expensive than the security credential used in secondary mode. For example, the initial credential can be a factory installed key based on asymmetric cryptographic operations such as public key/private key RSA (Rivest, Shamir and Adleman) or ECC (Elliptic Curve Cryptosystem) operations. The secondary association mode credential can be based on a symmetric cryptographic operation, such as an IEEE (Institute of Electrical and Electronic Engineer's) 802.11 four-way handshake.

In secondary association mode, a tag asserts a provisioned identification as the primary master key identification (PMKID) and a provisioned key as the primary master key (PMK). The tag advertises that MKID in an association request as it would normally do when using a pre-shared PMK. The association request also includes a parameter to indicate that the device making the association request is an RFID tag. In an example embodiment, a specific key agreement algorithm can be employed. The association can continue employing a 4-way handshake with the specified key.

For announce mode, the tag uses a provisioned key (which may be a different key than the key used for secondary association mode) to protect information sent by the tag when the tag is not in an associated state. The tag can also include its identity in announce messages. In an example embodiment, the tag uses AES-CCM (Advanced Encryption Standard—Counter with CBC-MAC "Cipher Block Chaining-Media Access Control") to protect messages. In this embodiment, the tag maintains a counter.

In an example embodiment, the controller employs a symmetric key management scheme that enables the controller to regenerate the key as needed, thus obviating the necessity for storing the keys in memory. All controllers employ a go master key "Km." There may be more than one Km for different purposes, such as for key rollover and/or for different applications. During an initial provisioning of secure credentials to a RFID tag, the controller generates an identity (TagID) for the tag and then computes a tag key (Kt) as follows: Kt=KDF(Km, TagID+Ad), where KDF is a key derivation function that behaves like a pseudo-random permutation. A cryptographic one-way hash function is suitable for this purpose. For example, KDF can be HMAC (keyed-Hashing for Message Authentication, RFC 2104) or PRF+ (Pseudorandom Function) used in IKEv2 (Internet Key Exchange). The identity may be randomly generated, but should include an indication of which Km was used by the KDF. The identity may also be generated so that the controller may be able to tell the difference between a valid identity and an invalid one. For example the ID may be chosen sequentially or derived from the address of the tag. The Ad is additional data that is presented by the tag, such as a Media Access Control (MAC) address. In an example embodiment, the KDF derives multiple keys from a set of inputs. Each of the multiple keys appears random. Each of the multiple keys and is different from the other keys, thus knowledge of one of the multiple keys does not provide knowledge of any the other derived keys.

The controller sends Kt and TagID to the tag. In an example embodiment, the controller generates keys for secondary association mode and announce mode. In an example embodiment, the controller can use a different master key (Km, e.g. Km1 and Km2) for each mode. In an example embodiment, the controller can add additional data to the KDF for generating the keys, such as Kt=KDF(Km, TagID+Ad+L) where L is a label which is used to differentiate the keys. L would not have to be sent to the RFID tag because the controller can figure out which key to use based on the context of the communication from the RFID tag (e.g. whether the communication is a tag announcement or an association request). In particular embodiments, the controller can employ a different identification (TagID) for each mode; moreover, a different TagID can be provisioned to the tag for each application. Alternatively, the tag may use a different address (Ad) for each application. The controller may now discard Kt because with TagID the controller can regenerate Kt as needed. The controller may log TagID and Ad for auditing purposes.

When the tag presents the identity (TagID) to the controller (as well as its address "Ad" such as its MAC address), the controller can regenerate Kt to authenticate the tag. By employing an appropriate one-way function for KDF, it can be computationally infeasible to derive Km from a known Kt. TagID and Ad.

While provisioning an RFID tag with security credentials in the initial (primary) association mode, the controller can also configure the tag to associate at predetermined intervals and/or assign a lifetime to the provisioned credentials. This can enable the controller to provision new credentials to the tag as desired and also to provide periodic updates to the tag. For example, while in association mode, the controller can download a new or updated image to the tag.

FIG. 1 illustrates an example of a Radio Frequency Identification (RFID) Tag 10. Tag 10 comprises a wireless transceiver 12 and an antenna 14. Wireless transceiver 12 and antenna 14 enable RFID tag 10 to wirelessly communicate with an associated network. Processor 16 is operatively coupled to transceiver 12. Processor 16 comprises logic for sending and receiving data via transceiver 12. "Logic," as used herein, includes but is not limited to hardware, firmware, software and/or combinations of each to perform a function (s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, processor 16 is configured to initiate a first connection with a network via wireless transceiver 12. The first connection is secured with a pre-established key. For example the pre-established key may be a factory installed key. In an example embodiment, the pre-established key can be based on asymmetric cryptography and public key infrastructure (PKI). While the first connection is established, processor 16 is configured to receive an identifier, an announce mode key and a secondary mode key from the network secured with the first key. In particular embodiments, the announce mode key and secondary association key are derived using symmetric cryptography, which is less computationally intensive the asymmetric cryptography and does not utilize third party certificate entities.

After processor 16 has been provisioned with the announce mode and secondary association mode keys, RFID tag operates either in announce mode or secondary association mode. While operating in announce mode, processor 16 is configured to send data packets to the network encrypted with the announce mode key. Data packets sent in announce mode comprise the identifier and an address. While operating in secondary association mode, processor 16 is configured to send data packets to the network encrypted with the secondary mode key. Data packets in secondary association mode comprise the identifier and the address.

In an example embodiment, during the first association, and/or while associated with the network in a secondary association mode, processor 16 is configured to receive data indicative of when the secondary association key and/or announce mode key expires. After the key expires, processor 16 attempts to associate with the network. Processor 16 can be configured to discard the secondary association and/or announce mode keys after a predetermined interval after the keys expire or after the keys are used to encrypt a certain amount of data, and use the factory default and/or asymmetric key to associate with the network.

In an example embodiment, processor 16 receives a plurality of identities, where each of the plurality of identities is associated with a unique key. In particular embodiments, the plurality of keys can be organized such that communications for each application executed by processor 16 is secured by a unique key. The selection of keys can also be done to make tracking the use of the tag by an external observer more difficult. Processor 16 inserts the identity corresponding to the key being used to protect a data frame into the data frame, for example the identifier can be inserted into the frame's header.

In an example embodiment, processor 16 is configured to switch to a secondary association mode at predetermined intervals. This enables processor 16 to receive updated key information. In particular embodiments, processor 16 can also receive upgrades/updates, such as image updates while in secondary association mode. In an example embodiment, 802.11 security is employed to secure the initial and/or secondary association modes.

Figure 2:
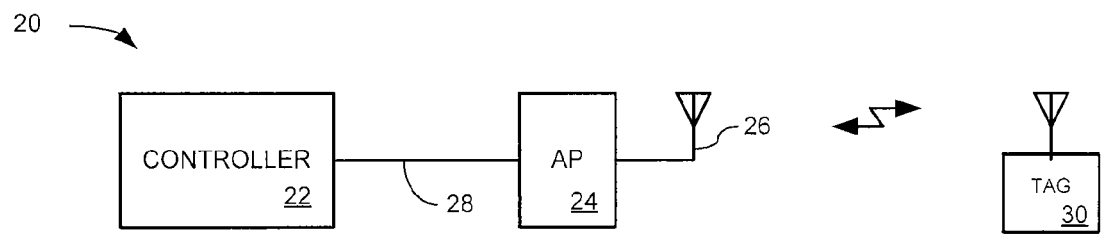
FIG. 2 illustrates an example of a network controller.

FIG. 2 illustrates an example of a network 20 employing a controller 22. Controller 22 comprises logic for configuring RFID tags, e.g. tag 30, and is configured for sending and receiving data with an RFID tag via at least one access point (AP) 24. Access point 24 employs an antenna 26 to wirelessly communicate with RFID tags. AP 24 is coupled to controller 22 via a communication link 28. Communication link 28 is suitably any wired (e.g. Ethernet) or wireless (e.g. RF) communication. In the illustrated example, controller 22 is coupled to one AP, AP 24, which is merely for ease of illustration as controller 22 can be coupled to a multiplicity of APs.

Upon an initial association with RFID tag 30, a secure session is established. In an example embodiment, the initial association is secured with a predefined security credential such as a pre-installed factory key installed into tag 30. In another example embodiment, asymmetric cryptography is employed to secure communications between AP 24 and Tag 30. During the initial association, controller 22 logic assigns an identifier (TagID) for tag 30 and derives an announce mode key for tag 30. The announce mode key is derived from a master key (e.g. Km) associated with network 20 and/or controller 22, TagID and an address (Ad) associated with tag 30. The announce mode key is sent via AP 24 to tag 30 secured with the initial security credential. In particular embodiments, wireless controller 22 logic is configured to generate a secondary association mode key for RFID tag 30.

In an example embodiment, wireless controller 22 logic is configured to generate the announce mode key and secondary association mode key with a one-way function (KDF). For example, Kt=KDF(Km, TagID+Ad) where Kt is the key value, Km is the network 20 and/or controller 22 master key, TagID is an identifier assigned to RFID tag 30 and Ad is an address for RFID tag 30.

Many different techniques are suitable for differentiating between announce mode and secondary association mode keys. For example, as disclosed herein, keys may be derived as Kt=KDF(Km, Id+Ad+L), where L is a label used to differentiate between keys. In an example embodiment, wireless controller 22 logic is configured to employ a first master key (e.g. km1) to generate the announce mode key and a second master key (e.g. km2) to generate the secondary association mode key. As another example, wireless controller 22 logic is configured to derive the announce key by employing a first identifier (TagID1) for the announce mode key, e.g., Kt (announce mode)=KDF(Km, TagID1+Ad) and to derive the secondary association key by employing a second identifier TagID2 for the secondary association mode key, e.g. Kt (secondary association)=KDF(Km, TagID2+Ad). As another example, different addresses (e.g. Ad1, Ad2) can be employed to generate the keys.

In an example embodiment, controller 22 can determine which key to employ based on the context of the communication from tag 30. For example, if tag 30 is sending an announce packet, controller 22 is configured to use the announce key; however, if tag 30 is attempting to associate (a secondary association after the initial association), controller 22 is configured to use the secondary association key.

In an example embodiment, wireless controller 22 logic is configured to discard the announce mode key and/or the secondary association key responsive to sending the keys to RFID tag 30. Once the keys are provisioned, subsequent messages from RF tag 30 will include the identifier (TagID or TagID+L) and address (Ad) enabling controller 22 to regenerate the keys as needed. In particular embodiments, controller 22 can maintain in memory identifiers and association mode keys for RFID tags recently that recently sent a message. For example RFID tags that sent a message within the last hour, or the last 10 RFID tags to send a message.

Wireless controller 22 can be configured to designate a lifetime for the keys and perform life cycle management. For example, when provisioning keys to RFID tag 30, wireless controller 22 can include data indicating when the keys expire. Wireless controller 22 can be configured to allow old keys for a predetermined time period, such as during one-half the lifetime of the next key. Wireless controller 22 can also be configured to use a previously defined first key (e.g. the factory default key or asymmetric credential) to decrypt a message received from RFID tag 30 responsive to not receiving a message from RFID tag 30 for longer than a predefined time period. For example, if communication with RFID tag 30 has been lost for more than a predefined time period, RFID tag 30 re-connects with AP 24 using the initial key provisioned with new announce mode and/or secondary association mode keys.

In an example embodiment, wireless controller 22 logic sends data to RFID tag 30 indicative of a time interval for the RFID tag to switch to secondary association mode. For example, wireless controller 22 can send data to RFID tag 30 to instruct RFID tag 30 to switch to the secondary association mode once a day or once a week. Once in secondary association mode, RFID tag 30 can be provisioned with fresh security credentials, such as a new announce mode key and secondary association key. Other upgrades, such as image upgrades may also be performed while in secondary association mode.

Figure 3:
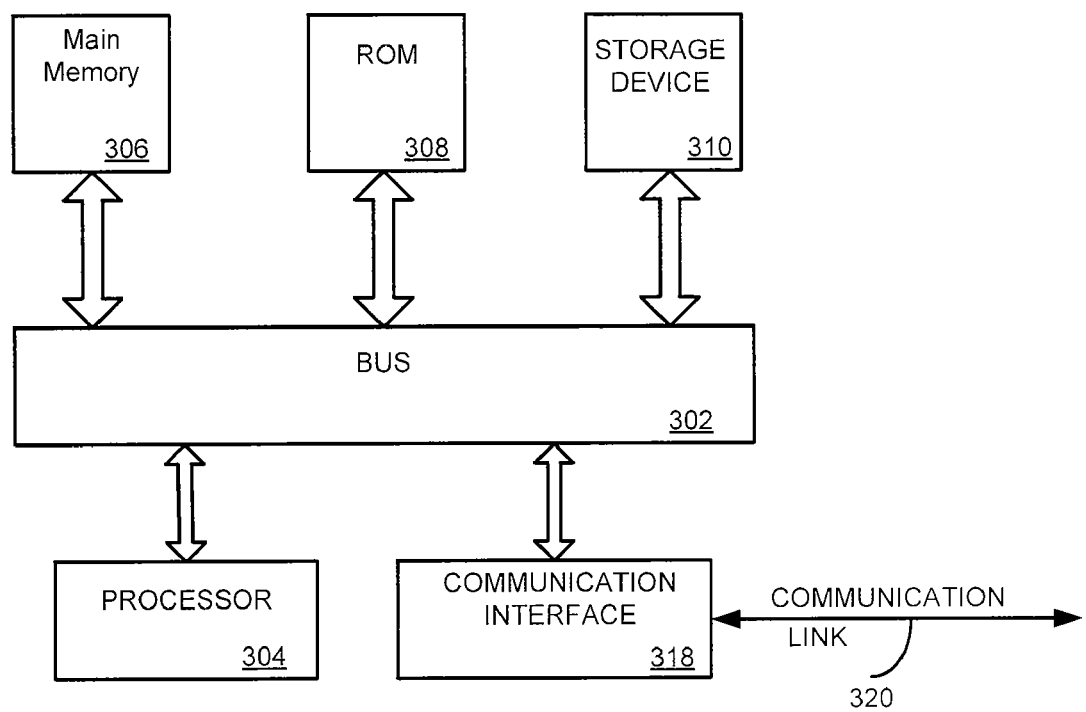
FIG. 3 illustrates an example of a computer system for implementing an example embodiment.

FIG. 3 illustrates an example of a computer system 300 for implementing an example embodiment. For example, computer system 300 is suitable for implementing controller 22 (FIG. 2) and/or processor 16 (FIG. 1). Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for providing secure communications for active RFID tags. According to an example embodiment, providing secure communications for active RFID tags is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a communication link 320. Communication link 320 can be used to couple computer system 300 to other devices. For example, when implementing an RFID tag as illustrated in FIG. 1, communication interface 318 may be a wireless transceiver. As another example, for implementing a controller as illustrated in FIG. 2, communication interface can be an Ethernet card coupled to one or more APs via a network. As another example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

In particular embodiments, computer system 300 can receive code via communication interface for execution by processor 304. The received code may be executed by processor 304 as it is received, and/or stored in storage device 310, or other non-volatile storage for later execution. In this manner, computer system 300 may obtain application code in the form of a carrier wave.

Figure 4:
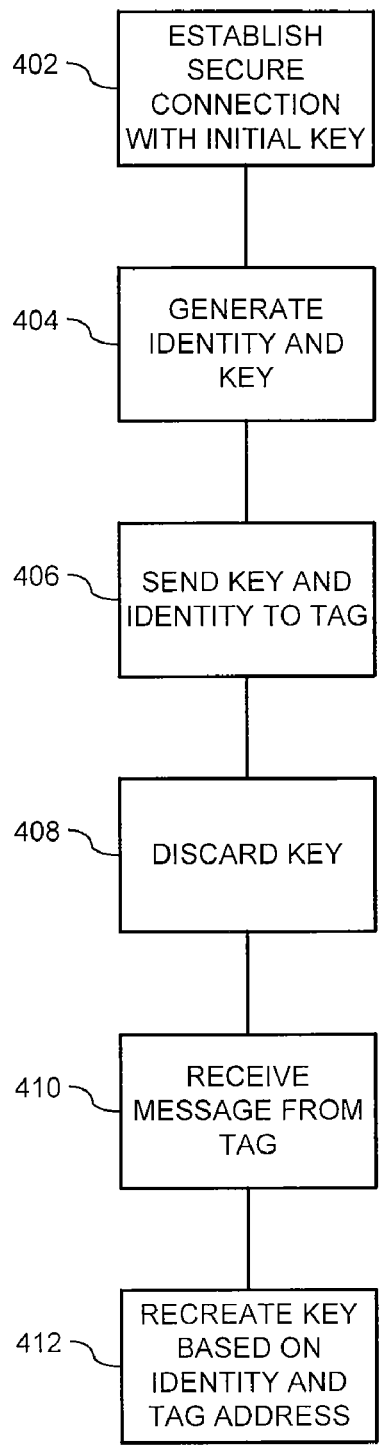
FIG. 4 illustrates an example methodology.

In view of the foregoing structural and functional features described above, a methodology 400 in accordance with an example embodiment will be better appreciated with reference to FIG. 4. While, for purposes of simplicity of explanation, methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. Methodology 400 described herein is suitably adapted to be implemented in hardware, software, or a combination thereof.

At 402, a secure connection is established with an initial key between a tag and a controller. In an example embodiment, the secure connection may be established using a factory installed key. In an example embodiment, the connection may employ asymmetric cryptography to establish the secure session, such as Public Key/Private Key, KERBEROS, or other technique which may employ a trusted third party authority.

At 404, the controller generates an identity and a key for the tag. In an example embodiment, the controller uses a one-way key derivation function (KDF), which can be represented as Kt=KDF(Km, TagID+Ad), where Km is a master controller key, TagID is an identifier for the tag and Ad is an address associated with the tag, such as a MAC address. In particular embodiments, the controller generates multiple keys. For example, the controller may generate one key for announce mode and one key for secondary association mode. In some embodiments, the controller may generate additional identities associated with applications. The controller may also employ different master keys, e.g. Km1, Km2, for generating different keys. Optionally, the controller may include an additional label for differentiating keys, for example Kt=KDF (Km, TagID+Ad+L). In another alternative, the controller may employ different addresses Ad for different tag applications. In another alternative, the controller may not use the address, Ad, in the key derivation.

At 406, the controller sends the key and identity to the tag. The key and identity are sent to the tag employing the initial secure connection. In embodiments employing multiple keys and/or multiple identities, all of the keys and identifiers are sent to the tag.

At 408, the controller discards the key. In particular embodiments, the controller maintain keys in memory of tags that recently communicated with the controller, for example the last 100 tags or tags which have communicated with the controller within the last hour.

At 410, the controller receives a message from the tag. The message can be an announce message or an association request. The message comprises an identifier TagID and an address Ad for the tag, or may contain a combination of TagID and Ad, for example TagID+Ad or TagID+Ad+L.

At 412, the controller recreates the key based on data received in the message, e.g. TagID and Ad. Because the controller uses the same master key Km for all tags, the controller can easily recreate the key by employing the original key derivation function, e.g. Kt=KDF(Km, TagID+Ad), where TagID and Ad are acquired from the message. Using the derived key, the controller can decrypt the message contents.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless system comprising a hardware processor configured to communicate with a radio frequency identification (RFID) tag via at least one wireless access point;
wherein the wireless system is configured to assign an identifier for the RFID tag during an initial communication session;
wherein the wireless system hardware processor is configured to generate an announce mode key for the RFID tag, the announce mode key is derived from the assigned identifier for the RFID tag and a master key;
wherein the wireless system hardware processor is configured to send the announce mode key and the assigned identifier for the RFID tag to the RFID tag;
wherein the wireless system hardware processor discards the announce mode key upon sending the announce mode key to the RFID tag;
wherein the wireless system hardware processor receives a message and an identifier for the RFID tag from the RFID tag;
wherein the wireless system hardware processor regenerates the announce mode key employing the master key and the identifier for the RFID tag received from the RFID tag; and
wherein the wireless control hardware processor employs the regenerated announce mode key to decrypt the message.

2. The apparatus of claim 1, wherein the announce mode key is derived from a master key, an address for the RFID tag and the identifier.

3. The apparatus of claim 1, further comprising:
the wireless system is configured to generate a secondary association mode key for the RFID tag; and
the wireless system is configured to send the secondary association mode key to the RFID tag.

4. The apparatus of claim 3, wherein the wireless system hardware processor is configured to discard the secondary association mode key responsive to sending the secondary association mode key to the RFID tag;
wherein the wireless system hardware processor is responsive to a message received via a wireless transceiver to acquire an address and the identifier from the message; and
wherein the wireless system hardware processor is further configured to regenerate the secondary association mode key employing a master key, the identifier acquired from the message and the address acquired from the message.

5. The apparatus of claim 3, wherein the wireless system hardware processor is configured to generate the announce mode key and secondary association mode key with a one-way hash function employing a master key, the identifier an address for the RFID tag and a predefined label to differentiate between the announce mode key and secondary association mode key.

6. The apparatus of claim 3, wherein the wireless system hardware processor is configured to employ a first master key to generate the announce mode key and a second master key to generate the secondary association mode key.

7. The apparatus of claim 3, wherein the wireless system hardware processor is configured to derive the announce mode key by employing a first identifier for the announce mode key and to derive the secondary association key by employing a second identifier for the secondary association mode key.

8. The apparatus of claim 1, wherein the wireless system hardware processor is configured to maintain identifiers and association mode keys for RFID tags recently that recently sent a message.

9. The apparatus of claim 1, wherein the initial communication session is established using a previously defined first key.

10. The apparatus of claim 9, wherein the wireless system hardware processor is configured to use the previously defined first key to establish a new key to decrypt a message received from the RFID tag responsive to not receiving a message from the RFID tag for longer than a predefined time period.

11. The apparatus of claim 1, wherein the wireless system, hardware processor sends data to the RFID tag indicative of a time interval for the RFID tag to switch to secondary association mode.

12. The apparatus of claim 1, wherein the wireless system hardware processor is further configured to determine a life cycle for the announce mode key.

13. The apparatus of claim 12, wherein the wireless system hardware processor is further configured to accept messages from the RFID tag encrypted with an expired announce mode key for a predetermined time period after the announce mode key expired.

14. A method, comprising:
establishing a first connection between a controller and a radio frequency identification (RFID) tag, wherein the first connection is secured with a first key;
generating an identifier for the RFID tag and an announce mode key for the RFID tag, the announce mode key is derived from a master key, the identifier for the RFID tag, and an address for the RFID tag;
provisioning the announce mode key and the identifier for the RFID tag to the RFID tag; and
discarding the announce mode key responsive to provisioning the announce mode key to the RFID tag;

receiving a message from the RFID tag, the message comprising an address for the RFID tag, an identifier for the RFID tag, and data encrypted with the announce mode key; and regenerating the announce mode key, the announce mode key derived from the master key, the identifier for the RFID tag in the message and the address for the RFID tag in the message; and decrypting the encrypted data with the regenerated announce mode key.

15. The method according to claim 14, further comprising:

generating a secondary association mode key derived from the master key, the identifier and the address for the RFID tag; and provisioning the secondary association mode key to the RFID tag.

* * * * *